H. HUEBER.
ATTACHMENT FOR MOTOR VEHICLES.
APPLICATION FILED FEB. 24, 1921.
1,414,513.
Patented May 2, 1922.
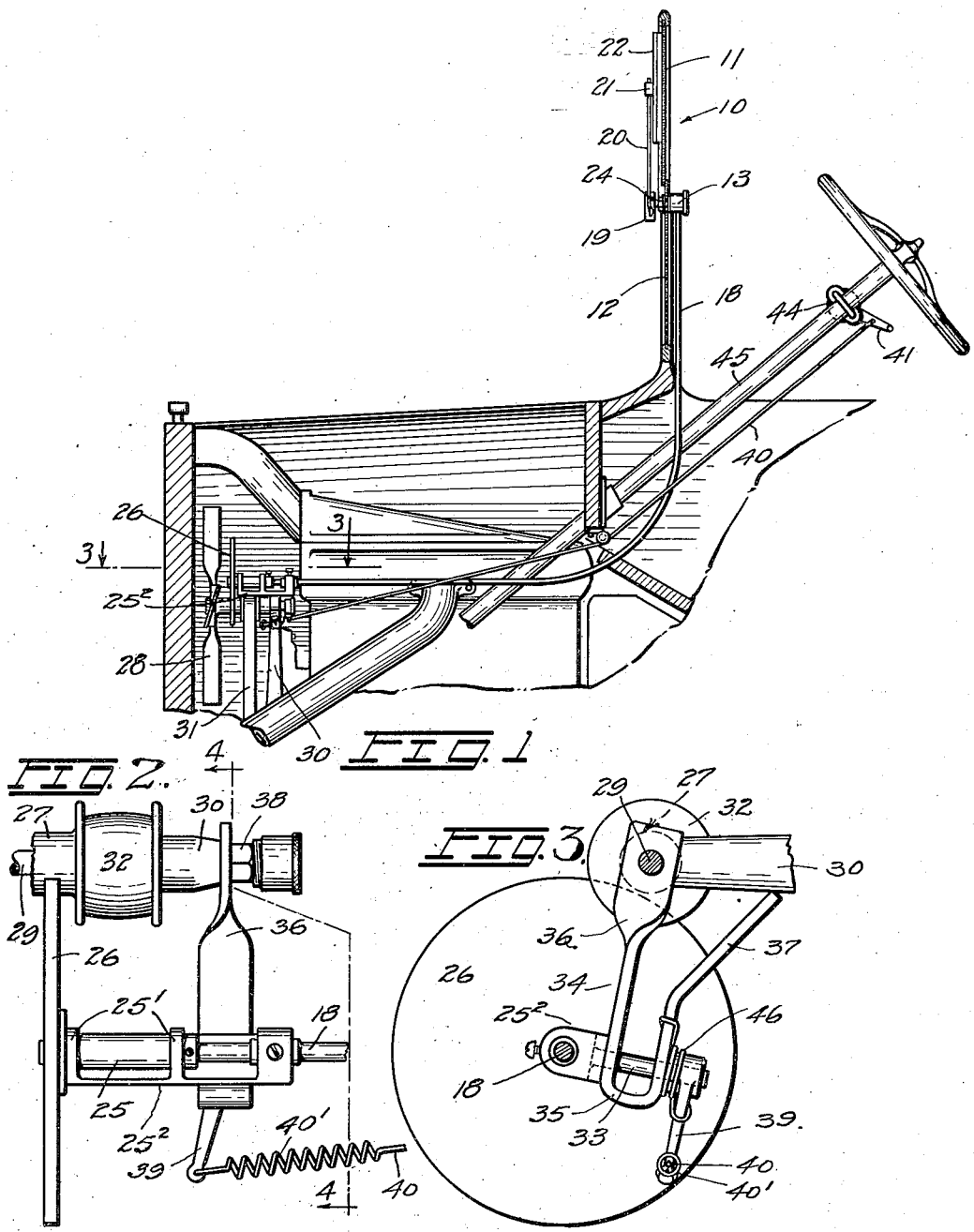
INVENTOR:
Henry Hueber
by
Pierre James
ATTORNEY

UNITED STATES PATENT OFFICE.

HENRY HUEBER, OF SEATTLE, WASHINGTON, ASSIGNOR OF ONE-HALF TO CASPER J. CASSUTT, OF SEATTLE, WASHINGTON.

ATTACHMENT FOR MOTOR VEHICLES.

1,414,513.   Specification of Letters Patent.   Patented May 2, 1922.

Application filed February 24, 1921. Serial No. 447,571.

*To all whom it may concern:*

Be it known that I, HENRY HUEBER, a citizen of the United States, residing at Seattle, in the county of King and State of Washington, have invented certain new and useful Improvements in Attachments for Motor Vehicles, of which the following is a specification.

This invention relates to certain new and useful improvements in attachments for automobiles and other motor vehicles.

The object of my invention is the provision of a device of this character which is operated by the vehicle engine and which is peculiarly efficient in use.

The invention consists in the novel construction, adaptation and combination of parts as will be hereinafter described and claimed.
In the accompanying drawings, Figure 1 is a longitudinal vertical section of a portion of an automobile with an embodiment of my invention applied thereto. Fig. 2 is a detail plan view from plane 3—3 in Fig.
1. Fig. 3 is a sectional view through 4—4 of Fig. 2.

In said drawing, the reference numeral 10 represents an automobile windshield the upper glass pane 11 thereof being illustrated as extending in front of the lower pane 12. 13 represents a gear case secured to the windshield as clearly shown in Figure 5.

A power transmitting shaft 18 is associated with the gear case, and the gears in said case operate a head 19, to which is connected an arm 20 having secured to its outer end an attachment 21 which carries a squeegee 22.

The power transmitting shaft 18 above referred to is of the flexible type and extends as shown in Fig. 1 to and secured within a socket of a stub shaft 25 which is journaled in apertured lugs $25^1$ of a bearing box $25^2$.

Rigidly mounted upon the forward end of the stub shaft 25 is a wheel 26 which is adapted to be frictionally driven by peripheral engagement with a sleeve 27 which constitutes the hub of air fan 28 and is rotatably mounted on an arbor 29 which is supported by a standard 30 as usual.
Said fan and its hub are, in turn, driven from the engine shaft, not shown, as by means of an endless belt 31 passing about a pulley 32 provided on the fan hub. The bearing box $25^2$ for said stub shaft is swiveled by means of a pin 33 to a bracket 34 of substantially the form in which it is shown in Figs. 2 and 3. As illustrated, said bracket consists of a bar folded at 35 to provide two branches 36 and 37, the branch 36 being provided with an aperture to engage over the arbor 29, and the other branch 37, engaging against the standard 30 which supports the arbor 29. A nut 38 engageable upon a threaded portion of the arbor 29 serves to secure the bracket part 36 against the standard 30. Secured to the swivel pin 33 is an arm 39 which is connected by a pull-rod or cable 40 with a controlling arm 41 which is fulcrumed by a pin or screw 42 to a plate 43 secured, as by a clip 44, to the steering post 45 or other place within convenient reach of the driver's seat. A spring 46 (Fig. 3) coiled several turns about the pin 33 and having its opposite ends respectively engaging said bracket and arm 39 acts through the latter and the swiveled bearing box $25^2$ to urge the wheel 26 into engaged relations with the fan hub to thereby transmit rotary motion through the flexible shaft 18 to revolve the windshield cleaning squeegee. To render the squeegee idle, the operator swings the controlling arm 41 thereby causing the pull-rod 40 to withdraw the friction wheel 26 out of engagement with the fan-hub 27. To elongate the pull-rod 40 for the purpose of accommodating the arcuate travel of the controlling arm, said rod desirably includes a helical portion $40^1$ as shown in Fig. 2.

From the foregoing description it is apparent that when the wheel 26 is allowed to engage the sleeve or fan-hub, the squeegee is caused to revolubly travel upon the windshield to remove moisture, snow, etc., from the upper glass pane thereof for the purpose of affording an unobstructed vision to the driver. When the wheel 26 is rendered inoperative the travel of the squeegee is stopped. The operation of the wheel 26 is controlled by the arm 41.

What I claim, is,—

1. In apparatus of the character described, the combination with the hub of an automobile air-fan, means to rotate the same, of a wheel, a spring yieldingly retaining said wheel in frictional engagement with the hub of said air-fan, means operable from the driver's seat in the automobile for disengaging said wheel from said hub, a flexible shaft connected at one of its ends to said wheel and means operated by the other end of the flexible shaft.

2. In an automobile, the combination with the fan shaft of an automobile engine, a member rotated thereby, a flexible shaft operated by said member, means operated by said flexible shaft, spring pressed means for operatively connecting the flexible shaft with said member, and means adapted to be regulated by the automobile driver for rendering the aforesaid means temporarily inoperative.

Signed at Seattle, Washington, this 16th day of February, 1921.

HENRY HUEBER.

Witnesses:
PIERRE BARNES,
MARGARET G. SUPPLE.